Patented Jan. 1, 1952

2,580,504

UNITED STATES PATENT OFFICE 2,580,504

HALOGENATED TRIFLUOROMETHYLSTYRENE MATERIALS AND METHOD OF MAKING SAME

Gustave B. Bachman, West Lafayette, Ind., and Leonda L. Lewis, Sanborn, N. Y., assignors to The Purdue Research Foundation, West Lafayette, Ind., a corporation of Indiana No Drawing. Application December 26, 1947, Serial No. 794,089

3 Claims. (Cl. 260—651)

This invention relates to polymerizable arylvinyl compounds and alpha-alkyl arylvinyl compounds containing a trifluoromethyl group and a halogen group directly substituted on the aromatic ring. It also relates to the method of preparing these materials and to polymers and copolymers resulting from the polymerization or copolymerization thereof.

Polymerizable nuclearly halogenated arlvinyl compounds, such as dichlorostyrene and para-chlorostyrene, fluorostyrene and the like, have heretofore been recognized to form polymers and copolymers having desirable characteristics for certain industrial applications. The nuclearly chlorinated styrenes are said to have exceptional optical properties. Certain trifluoromethylstyrenes have also been proposed. Such compounds are described in the Renoll Patent 2,414,330 of January 14, 1947, which discloses that they polymerize and copolymerize to form resinous materia.s which have a high degree of thermostability.

It is an object of tne present invention to provide nuclear-substituted arylvinyl compounds having the advantages of both the nuclearly halogenated arylvinyl compounds and the trifluoromethyl arylvinyl compounds.

It is another object of the present invention to provide monomeric materials which may be copolymerized with other monomeric materials to give resins and rubbery polymers having improved properties.

It is a further object of the present invention to provide a method of making such new monomeric materials.

Some of these as well as other objects which will be apparent from the following description of the inventions are accomplished by preparing arylvinyl compounds having at least one trifluoromethyl group and at least one halogen group directly substituted on the aromatic ring.

While most of the arylvinyl compounds having one or more halogenated groups and one or more trifluoromethyl groups simultaneously substituted on the aromatic ring may be produced. We have been unable to polymerize or copolymerize any of these compounds unless hydrogen is directly connected either to the alpha carbon of the side chain or to both of the ortho (2- and 6-) carbon atoms of the nucleus.

We have found that compounds having the general formula

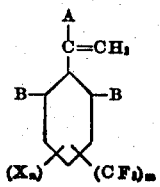

may be homopolymerized or copolymerized with other olefinic monomers, (monomers having an olefinic group activated for vinyl type of copolymerization) to produce rubbers and resinous materials having especially desirable properties. In the above general formula "A" is selected from hydrogen and methyl, "B" is selected from hydrogen, halogen and trifluoromethyl, "X" is halogen, including F, Cl and Br, and "n" and "m" are integers selected from 1 and 2. The compounds are further characterized in that "B" is hydrogen in all cases where "A" is methyl. We have been unable to polymerize or copolymerize by the emulsion or mass technique generally used for vinyl type polymerization and with peroxide or free radical catalysts compounds in which "A" is methyl and either or both "B's" are halogen, trifluoromethyl, methyl, etc. In fact we have have been unable to polymerize or copolymerize by the usual methods of vinyl polymerization any compounds in which "A" is methyl and "B" is simultaneously other than hydrogen.

Thus, we have been unable to polymerize or copolymerize by the usual vinyl polymerization procedures alpha-methyl-ortho-fluoro-para-trifluoromethylstyrene or any other compound having both the alpha-methyl substituent and a substituent such as halogen, alkyl, trifluoromethyl in the 2- and/or 6-positions. When, however, the "A" in the above general formula is methyl and "B" is hydrogen, we have found that very desirable copolymers with many monomers may be prepared by the usual methods of vinyl copolymerization involving free radical propagation and molecular growth. When, however, "A" is hydrogen, we have found that desirable homopolymers as well as copolymers may be prepared, even through "B" is methyl, trifluoromethyl or halogen.

Compounds within the above general formula having not more than two halogen atoms and not more than two trifluoromethyl groups usually yield upon polymerization or copolymerization rubbery and resinous materials that are superior in some respects to those having more halogen.

Examples of the compounds within the above general formula found to copolymerize or homopolymerize and form rubbery and resinous materials for commercial application are:

2-bromo-3-trifluoromethylstyrene;
4-fluoro-2-trifluoromethylstyrene;
4-fluoro-3-trifluoromethylstyrene;
4-fluoro-3-trifluoromethyl-alpha-methylstyrene;
4-chloro-3-trifluoromethylstyrene;
2-chloro-5-trifluoromethylstyrene;
4-fluoro-2-trifluoromethylstyrene;

4-chloro-2,6-bistrifluoromethylstyrene;
2-trifluoromethyl-4,6-difluorostyrene;
4-chloro-3-trifluoromethyl-alpha-methylstyrene;
4-chloro-3,5-di-trifluoromethyl - alpha - methylstyrene; and
2,5-bistrifluoromethyl-4-fluoro - alpha - methylstyrene.

The above compounds are generally prepared by first making the corresponding fluorobromobenzenes, converting these via Grignard reagents to the corresponding primary, secondary and tertiary alcohols (generally utilizing acetaldehyde or acetone), and then dehydrating the alcohols to the desired arylvinyl compounds. The secondary and tertiary alcohols are dehydrated most satisfactorily with an acid catalyst such as potassium acid sulfate, phosphorus pentoxide, etc., while the primary alcohols are usually most readily dehydrated with strong bases, such as potassium hydroxide, as catalysts. Both the secondary and the tertiary alcohols may also be dehydrated in the vapor phase over dehydration catalysts such as aluminum oxide or silica gel.

Any of the compounds within the above formula may be copolymerized with a monomeric polymerizable vinyl or olefinic compound, preferably one having the general formula

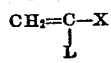

where L is selected from hydrogen and alkyl (including methyl) and X is an activating group preferably selected from >C=C<, phenyl, halogenated phenyl, —COOR (where R is alkyl, preferably methyl or hydrogen) and —CN. Copolymerization with these monomers is facilitated when L is hydrogen in all cases where X is aryl. These materials include methylacrylate, methyl methacrylate, acrylonitrile and other acrylic derivatives such as their amids, styrene, maleic anhydride, dichlorostyrene, butadiene-1,3, chloroprene, isoprene, dimethyl butadiene-1,3, and the like. When the vinyl compound that is mixed with the trifluoromethyl compound contains both an alkyl group such as a methyl group and a phenyl group attached to the same vinyl carbon atom, copolymerization is had only with difficulty. Compounds such as vinyl chloride, allyl chloride, vinyl acetate and others having less monomer reactivity than has vinylidene chloride also form with the alpha-methyl substituted compounds of the present invention copolymers only with the greatest difficulty. They do copolymerize, however, with the styrene compounds of the present invention that have the alpha carbon atom connected to hydrogen.

The polymerization or copolymerization may be carried out by any of the methods used for the preparation of vinyl polymers. Thus, the polymerization or copolymerization may be accomplished en masse or in bulk using a small amount of any monomer-soluble free radical-forming catalyst, such as benzoyl peroxide, triphenylmethyl and the like. Pearl polymerization may be accomplished in an emulsion or suspension in immiscible liquid, preferably an aqueous vehicle, which may contain an emulsifying agent such as a water-soluble fatty acid soap or granulating agent such as polymethylacrylamide, polyvinyl alcohol, sulfonated polystyrene, or even bentonite and hydrophilic pigments and the like.

When the polymerization is carried out in aqueous liquid in the absence of an effective emulsifying agent, as when the pearl polymerization technique is used, it is found that an adjustment in density of the aqueous liquid is desirable to prevent the pearls from agglomerating into a sticky mass. The adjustment in density is preferably accomplished by dissolving in the aqueous liquid a material such as sodium chloride, calcium chloride and the like that is capable of increasing the density thereof.

The following examples, in which parts are by weight, illustrate the present invention:

EXAMPLE 1

Preparation of 2-bromo-4-trifluoromethylstyrene

A Grignard reagent was prepared from 70.6 grams of magnesium, 425.6 grams of a distilled mixture of 2,5- and 3,4-dibromo-alpha-trifluorotoluene having about equal amounts of solid (2,5-dibromo-alpha-trifluorotoluene) and of liquid (3,4-dibromo-alpha-trifluorotoluene), 152.6 grams of ethyl bromide and two liters of absolute ether. This Grignard reagent was reacted with 144.6 grams of freshly distilled acetaldehyde and the resulting addition product was decomposed with 25% ammonium chloride. After filtering and drying, the ether solution was distilled at 3 mm. pressure. The crude product, having a boiling point of 98-108° C., was rectified under vacuum through a ten-inch Fenske column to give 96 grams of 2-bromo-alpha-methyl-4-trifluoromethylbenzyl alcohol. Twenty-five parts of this alcohol were incorporated with about 24 parts of crushed potassium hydroxide in a flask and immersed in an oil bath, which was rapidly heated to 180° C., and then gradually to 200° C. for over a period of one hour. The flask was arranged for vacuum distillation and the pressure was adjusted to 125 mm. This distillate was dried with calcium chloride and the product was then fractionally distilled. Seventeen grams of 2-bromo-4-trifluoromethylstyrene were obtained. This material had a boiling point at 5 mm. pressure of 72-73° C., a density $\frac{25}{25}$ of 1.558 and a refractive index $\frac{25}{D}$ of 1.5228

EXAMPLE 2

Preparation of 4-fluoro-3-trifluoromethylstyrene 753 grams of 5-bromo-alpha-trifluoro-2-nitrotoluene were prepared from 675 grams of 3-bromo-alpha-trifluorotoluene by a procedure analogous to that described by Finger and Reed, Journal of the American Chemical Society, 66, pages 1972-4. (1944). From 653 grams of the 5 - bromo - alpha - trifluoro - 2 - nitrotoluene there were obtained 639 grams of 4-bromo-alpha-trifluoro-o-toluidine by a procedure analogous to that used for the reduction of alpha, alpha, alpha-6-tetrafluoro-2-nitrotoluene, as described in the Finger and Reed article above noted.

266 grams of 4-bromo-2-trifluoromethylbenzenediazoniumfluoborate were prepared from 240 grams of this toluidine by a procedure analogous to that given in the Finger and Reed article for the preparation of 4-fluoro-2-trifluoromethylbenzenediazoniumfluoborate. 262 grams of the fluoroborate salt thus obtained were decomposed by gentle heating in a one-liter distilling flask fitted with a condenser set for downward distillation. Two 500 ml. Erlenmeyer flasks, immersed in an ice-salt bath, were used in series as receivers to insure complete condensation of the product. The distillate was washed several times with water, dried with calcium chloride and then distilled at 50 mm. pressure. 160 grams of the colorless liquid, 5-bromo-alpha, alpha, alpha, 2-tetrafluorotoluene, were obtained.

A Grignard reagent was prepared from 42 grams of this liquid, 4.3 grams of magnesium, and 170 ml. of absolute ether. A solution of 9.5 grams of acetaldehyde in 50 ml. of ether was added and the addition product decomposed with 28 ml. of 25% ammonium chloride. After filtering, the ether solution was dried, the solvent removed and the residue distilled at reduced pressure. 26 grams of crude 4 - fluoro - alpha - methyl - 3 - trifluoromethylbenzyl alcohol were obtained which were rectified to obtain 22 grams of the pure alcohol. A mixture of 107 grams of this alcohol, 5 grams of phosphorus pentoxide and 1 gram of picric acid was then distilled at 90 to 100 mm. pressure using an oil bath with an initial temperature of 143° C. and a final temperature of 170° C. The distilled product was washed with water, dried with calcium chloride and rectified in the presence of trinitrobenzene to obtain 65 grams of 4-fluoro-3-trifluoromethylstyrene.

The physical constants of the styrene obtained were found to be as follows: B. P. 77–78° C. (40 mm.);

$d_4^{25}$ 1.263 and $n_D^{25}$ 1.4522.

EXAMPLE 3

*Preparation of 4-fluoro-alpha-methyl-3-trifluoromethylstyrene*

A Grignard reagent was prepared from 162 grams (0.666 mol) of 5-bromo-alpha, alpha, alpha, 2-tetrafluorotoluene and 16.3 grams (0.67 mol) of magnesium in 900 ml. of absolute ether. A solution of 41.5 grams (0.715 mol) of acetone in 100 ml. of ether was added, and the resulting complex was decomposed with 100 ml. of 25% NH₄Cl. The ether solution was filtered, dried and distilled, and 115 grams of crude product (B. P. 75–85° C. (5 mm.)) were collected. This was rectified through a ten-inch Fenske column and 102 grams (0.462 mol. 69.5% yield) of the pure alpha, alpha - dimethyl - 4 - fluoro - 3 - trifluoromethylbenzyl alcohol were obtained. 100.6 grams of this compound were then dehydrated in a similar manner to that described in Example 1 and about 83 grams of 4-fluoro-alpha-methyl-3-trifluoromethylstyrene were obtained.

The physical constants of the styrene were as follows: B. P. 89–91° C. (40 mm);

$d_4^{25}$ 1.230 and $n_D^{25}$ 1.4530.

EXAMPLE 4

*Polymerization of fluorinated styrenes*

Samples of 2-bromo-4-trifluoromethylstyrene, 4-fluoro-3-trifluoromethylstyrene and 4-fluoro-alpha-methyl-3-trifluoromethylstyrene containing 0.5% benzoyl peroxide were placed in small stoppered test tubes (1 x 5 cm.) and heated in an oven at 70° C. After three days the styrenes containing no methyl group on the alpha carbon had completely polymerized. The polymers were hard, tough, colorless, crystal-clear materials. The alpha-methylstyrene failed to polymerize even after several weeks at 70° C.

EXAMPLE 5

*Copolymerization of fluorinated styrenes*

Portions of the trifluoromethyl arylvinyl compounds prepared in each of the above Examples 1 to 3 were mixed with vinyl acetate, methyl methacrylate, styrene and maleic anhydride, and about .5%, based on the weight of the monomeric materials, of the free radical-forming catalyst benzoyl peroxide. The polymerization temperature was 70° C. The percentage by weight of comonomer used in each instance was calculated on a molar basis and both this percentage, the polymerization time and the result of the polymerization are shown in the following table.

TABLE

| Fluorinated Styrene | Comonomer and percent of Mixture | Result |
|---|---|---|
| 2-bromo-4-trifluoromethylstyrene. | Vinyl Acetate 40% | Hard translucent polymer after 117 hours. |
| 2-bromo-4-trifluoromethylstyrene. | Methyl Methacrylate 50% | Hard, clear, slightly yellow plastic after 5 hours. |
| 2-bromo-4-trifluoromethylstyrene. | Styrene 50% | Hard, clear, colorless plastic after 17 hours. |
| 2-bromo-4-trifluoromethylstyrene. | Maleic Anhydride 25% | Hard, clear, slightly yellow polymer after 45 hours. |
| 4-fluoro-3-trifluoromethylstyrene. | Vinyl Acetate 40% | Hard translucent polymer after 102 hours. |
| 4-fluoro-3-trifluoromethylstyrene. | Methyl Methacrylate 50% | Hard, clear, slightly yellow plastic after 46 hours. |
| 4-fluoro-3-trifluoromethylstyrene. | Styrene 50% | Hard, clear, colorless plastic after 46 hours. |
| 4-fluoro-3-trifluoromethylstyrene. | Maleic Anhydride 25% | Hard, cloudy plastic after 46 hours. |
| 4-fluoro-alphamethyl-3-trifluoromethylstyrene. | Vinyl Acetate 50% | No polymer after 1 month. |
| 4-fluoro-alphamethyl-3-trifluoromethylstyrene. | Methyl Methacrylate 60% | Hard, clear, slightly yellow plastic after 1 month. |
| 4-fluoro-alphamethyl-3-trifluoromethylstyrene. | Styrene 60% | Clear, hard, colorless plastic after 12 days. |
| 4-fluoro-alphamethyl-3-trifluoromethylstyrene. | Maleic Anhydride 50% | Clear, slightly yellow brittle polymer after 102 hours. |

EXAMPLE 6

*Copolymerization of fluoroalkyl styrene with butadiene*

About 25 parts of each of the arylvinyl compounds prepared in Examples 1 to 3, inclusive, were mixed with 75 parts of butadiene and emulsified in a solution consisting of 180 parts of water, 5 parts of soap (sodium stearate) and .4 part of potassium persulfate, in the presence of .2 part of lauryl mercaptan. The mixture in each case was held at about 40° C. with constant agitation for about 40 hours. The latex-like products obtained were coagulated with salt and sulfuric acid, utilizing the same procedure generally used for the industrial preparation of butadiene-styrene copolymers. A rubbery material was obtained in each instance which had properties equivalent to or better than those of butadiene and styrene copolymers.

The other nuclearly halogenated trifluoromethylstyrenes mentioned above may be prepared by methods analogous to those used in Example 3 and may be polymerized or copolymerized by the methods described in Examples 4 and 5 to produce both rubbery and resinous products.

The presence of one or more trifluoromethyl groups and one or more nuclear halogen groups gives to the copolymers and polymers produced therewith desirable thermal properties as well as desirable optical properties so that they are useful for the preparation of many commercial articles.

It is also apparent that modifications of the invention may be made without changing the spirit thereof, and it is intended that the invention be limited only by the appended claims.

What we claim is:

1. 4-fluoro-3-trifluoromethyl-alpha-methylstyrene.

2. A monofluoro-trifluoromethyl-alpha-methylstyrene having both carbon atoms of the nucleus, that are ortho to the carbon carrying the vinyl group, connected directly to hydrogen.

3. A nuclearly halogenated trifluoromethyl-aryl-olefinic compound having the general formula

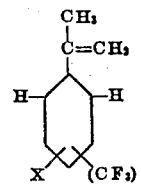

in which X is halogen.

GUSTAVE B. BACHMAN.
LEONDA L. LEWIS.

REFERENCES CITED

The following references are of record in the file of this patent:

UNITED STATES PATENTS

| Number | Name | Date |
| --- | --- | --- |
| 2,469,845 | Renall | May 10, 1949 |
| 2,522,491 | Clark | Sept. 19, 1950 |

OTHER REFERENCES

Marvel et al.: J. Am. Chem. Soc., 68, pages 736–738 (May 1946).

Renoll: J. Am. Chem. Soc., pages 1159–64 (July 1946).

Bachman et al.: J. Am. Chem. Soc., 69, 2022–25 (August 1947).